United States Patent [19]
Godyak et al.

[11] Patent Number: 5,289,085
[45] Date of Patent: Feb. 22, 1994

[54] CAPACITIVELY DRIVEN RF LIGHT SOURCE HAVING NOTCHED ELECTRODE FOR IMPROVED STARTING

[75] Inventors: Valery A. Godyak, Brookline; Robert B. Piejak, Wayland; Benjamin M. Alexsandrovich, Brookline, all of Mass.

[73] Assignee: GTE Products Corporation, Danvers, Mass.

[21] Appl. No.: 961,755

[22] Filed: Oct. 16, 1992

[51] Int. Cl.⁵ .............................. H05B 41/16
[52] U.S. Cl. .................... 315/248; 315/34; 315/39; 315/344; 315/261; 315/58
[58] Field of Search ............ 315/246, 248, 34, 39, 315/344, 261, 58

[56] References Cited

U.S. PATENT DOCUMENTS

| | | | |
|---|---|---|---|
| 2,139,815 | 12/1938 | Fodor | 315/246 |
| 2,184,530 | 12/1939 | Penney et al. | 315/248 |
| 2,525,624 | 10/1950 | Stahl et al. | 315/248 |
| 4,005,330 | 1/1977 | Glascock, Jr. et al. | 315/57 |
| 4,010,400 | 3/1977 | Hollister | 315/248 |
| 4,017,764 | 4/1977 | Anderson | 315/248 |
| 4,189,661 | 2/1980 | Haugsjaa et al. | 315/39 |
| 4,266,167 | 5/1981 | Proud et al. | 315/248 |
| 4,427,923 | 1/1984 | Proud et al. | 315/248 |
| 4,798,997 | 1/1989 | Egami et al. | 315/115 |
| 4,857,806 | 8/1989 | Nilssen | 315/72 |

Primary Examiner—Robert J. Pascal
Assistant Examiner—Michael B. Shingleton
Attorney, Agent, or Firm—Carlo S. Bessone

[57] ABSTRACT

A fluorescent light source includes a twin tube fluorescent lamp having first and second electrodes at or near the ends thereof for capacitive coupling of RF electrical energy to a low pressure discharge within the fluorescent lamp and a RF source having a first output lead electrically coupled to the first electrode and a second output lead electrically coupled to the second electrode. The capacitive coupling electrodes can be conductive layers on the outside surface of the twin tube fluorescent lamp. In an alternative configuration, the electrodes are cold cathode electrodes located within the twin tube fluorescent lamp. Filaments for emitting electrons are not required. When the RF voltage applied to the fluorescent lamp is not sufficient to initiate discharge, a starting device can be utilized. The fluorescent light source preferably includes a lamp base for supporting the fluorescent lamp. The RF source can be mounted within the lamp base.

8 Claims, 4 Drawing Sheets

CAPACITIVELY DRIVEN RF LIGHT SOURCE HAVING NOTCHED ELECTRODE FOR IMPROVED STARTING

CROSS-REFERENCE TO A RELATED APPLICATION

This application discloses, but does not claim, inventions which are claimed in U.S. Ser. No. 07/961,753 filed concurrently herewith and assigned to the Assignee of this application.

FIELD OF THE INVENTION

This invention relates to fluorescent light sources and, more particularly, to compact fluorescent light sources wherein a twin tube fluorescent lamp is energized by capacitively coupling RF electrical energy to a low pressure discharge within the fluorescent lamp.

BACKGROUND OF THE INVENTION

Compact fluorescent lamps have been developed as replacements for incandescent lamps because fluorescent lamps are considerably more efficient and have longer operating lives than incandescent lamps. A compact fluorescent lamp has roughly the shape of an incandescent lamp and can be installed in a conventional lamp socket. Prior art compact fluorescent lamps have had one or more disadvantages. A lamp ballast circuit is required, since fluorescent lamps cannot be operated directly from line voltage. The ballast circuit adds to the cost of the lamp and must be packaged in the base of the lamp. Furthermore, the form factor of the fluorescent lamp tube is less than ideal for use as an incandescent lamp replacement because the light emitted per unit volume is maximized in a long, small diameter fluorescent lamp tube.

Current compact fluorescent lamps use a twin tube or double twin tube architecture. Twin tube fluorescent lamps typically include a pair of straight tubes that are interconnected at or near one end to form a generally U-shaped tube. Conventional twin tube fluorescent lamps have filament cathodes at opposite ends, and a continuous discharge extends between the cathode filaments. A compact fluorescent lamp using a frequency converting ballast to convert 60 Hz line voltage to a frequency in the range of 20-30 kHz is disclosed in U.S. Pat. No. 4,857,806 issued Aug. 15, 1989 to Nilssen. The high frequency output of the ballast is applied to the lamp filaments.

Compact fluorescent lamps utilizing electrodeless fluorescent lamps have been disclosed in the prior art. A closed loop magnetic core transformer, contained in a reentrant cavity in the lamp envelope, induces a discharge in an electrodeless fluorescent lamp in U.S. Pat. No. 4,005,330 issued Jan. 25, 1977 to Glascock et al. Discharge is induced by a magnetic core coil within the envelope of an electrodeless fluorescent lamp in the light source disclosed in U.S. Pat. No. 4,017,764 issued Apr. 12, 1977 to Anderson. In both of the above-mentioned patents, the operating frequency is limited to about 50 kHz because of the lossy nature of magnetic materials at high frequency. An electrodeless fluorescent light source utilizing an air core coil for inductive coupling at a frequency of about 4 MHz is disclosed in U.S. Pat. No. 4,010,400 issued Mar. 1, 1977 to Hollister. However, such a light source has a tendency to radiate at the power of operation and exhibits nonuniform plasma excitation.

An electrodeless fluorescent light source, utilizing frequencies in the 100 MHz to 300 GHz range, is disclosed by Haugsjaa et al in U.S. Pat. No. 4,189,661 issued Feb. 19, 1980. High frequency power, typically at 915 MHz, is coupled to an ultraviolet producing low pressure discharge in a phosphor coated electrodeless lamp which acts as a termination within a termination fixture.

A compact fluorescent light source wherein high frequency power is capacitively coupled to a low pressure discharge is disclosed in U.S. Pat. No. 4,266,167 issued May 5, 1981 to Proud et al. The lamp envelope has an outer shape similar to that of an incandescent lamp. An outer conductor, typically a conductive mesh, is disposed on the outer surface of the lamp envelope, and an inner conductor is disposed in a reentrant cavity in the lamp envelope. Frequencies in the range of 10 MHz to 10 GHz are suggested. An electrodeless discharge tube wherein high frequency energy is coupled to a discharge through external electrodes is disclosed in U.S. Pat. No. 4,798,997 issued Jan. 17, 1989 to Egami et al. Another electrodeless fluorescent light source which is energized by a high frequency power source is disclosed in U.S. Pat. No. 4,427,923 issued Jan. 24, 1984 to Proud et al. In all of the lamps that operate at high frequency, it is important to minimize radiation of the high frequency energy.

It is a general object of the present invention to provide improved fluorescent light sources.

It is another object of the present invention to provide a compact fluorescent lamp that is suitable for replacement of an incandescent lamp.

It is a further object of the present invention to provide a fluorescent light source wherein a twin tube fluorescent lamp is capacitively driven by RF electrical energy.

It is yet another object of the present invention to provide a RF driven compact fluorescent lamp which produces very little RF radiation.

It is still another object of the present invention to provide fluorescent light sources which are low in cost and easy to manufacture.

SUMMARY OF THE INVENTION

According to the present invention, these and other objects and advantages are achieved in a fluorescent light source comprising a twin tube fluorescent lamp having first and second electrodes disposed at or near the ends thereof for capacitive coupling of RF electrical energy to a low pressure discharge within the fluorescent lamp, and a RF source having a first output lead electrically coupled to the first electrode and a second output lead electrically coupled to the second electrode.

The twin tube fluorescent lamp includes two generally straight tube sections and an interconnection between the straight tube sections at or near one end. The first and second electrodes are located adjacent to each other at or near the other end. Examples of twin tube fluorescent lamps include U-shaped fluorescent lamp tubes and parallel lamp tubes joined together by a "kiss joint".

The capacitive coupling electrodes can comprise conductive layers on the outside surface of the twin tube fluorescent lamp at or near the ends thereof. In this configuration, the twin tube fluorescent lamp is electrodeless. In an alternative configuration, the electrodes can comprise cold cathode electrodes located within the twin tube fluorescent lamp at or near the ends thereof. Filaments for emitting electrons are not required in the twin tube fluorescent lamp.

When the RF voltage applied to the twin tube fluorescent lamp is sufficient to initiate a low pressure discharge, a starting device is not required. When a lower RF voltage is utilized, the light source can include starting means for initiating a low pressure discharge within the fluorescent lamp. The starting means can comprise means coupled to the RF source for producing a high RF electric field region within the fluorescent lamp. The RF source preferably operates in a frequency range of about 3 MHz to 300 MHz and most preferably operates in a frequency range of about 10 MHz to 100 MHz.

In accordance with another feature of the invention, the fluorescent light source includes a lamp base for supporting the twin tube fluorescent lamp. The RF source is mounted within the lamp base such that the light source can be installed in a conventional lamp socket.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
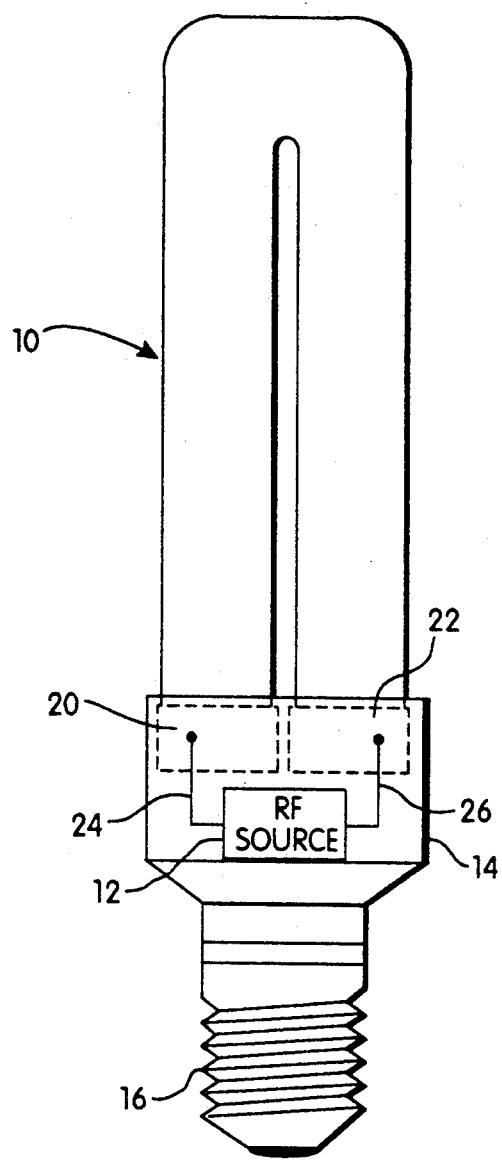
FIG. 1 is an elevational view of a fluorescent light source in accordance with the present invention.

A fluorescent light source in accordance with the present invention is illustrated in FIG. 1. A twin tube fluorescent lamp 10 is driven by a RF source 12. The RF source 12 is preferably mounted in a base 14 of the light source. The base 14 supports twin tube fluorescent lamp 10 and includes a plug 16 for installation in a conventional lamp socket. The RF source 12 is powered by conventional line voltage received through plug 16.

In twin tube fluorescent lamp 10, a glass lamp envelope contains a fill material, such as argon and mercury, for sustaining a low pressure discharge and has a phosphor coating on its inside surface. The term "twin tube fluorescent lamp" is intended to include any fluorescent lamp having two generally straight tube sections that are interconnected at or near one end. Examples include U-shaped lamp tubes as shown in FIG. 1 and parallel tube sections that are joined together by a "kiss joint".

The fluorescent lamp tube 10 has capacitive coupling electrodes 20 and 22 at or near the ends thereof for capacitive coupling of RF electrical energy from source 12 to a low pressure discharge within lamp 10. An output lead 24 of RF source 12 is connected to electrode 20, and an output lead 26 is connected to electrode 22. In the embodiment of FIG. 1, the electrodes 20 and 22 are formed on an external surface of the lamp envelope. The low pressure discharge within fluorescent lamp 10 emits radiation, typically in the ultraviolet, which stimulates emission of visible light by the phosphor coating. Suitable phosphor coatings are well known in the art.

The RF source 12 preferably has an output frequency in the range of about 3 MHz to 300 MHz. Most preferably, the operating frequency is in the range of about 10 MHz to 100 MHz. The use of RF frequencies rather than microwave frequencies (1 GHz or more) permits the fluorescent lamp 10 to be driven with a relatively inexpensive, efficient and easily-built power source. The capacitive coupling technique is advantageous over prior art inductive coupling techniques because of its simple implementation and its relatively high efficiency at low discharge power. Unlike inductive coupling, the capacitive coupling technique makes it possible to effectively energize a twin tube or double twin tube fluorescent lamp.

In the lamp of FIG. 1, RF electrical energy is applied to the external electrodes 20 and 22. Displacement current is coupled through the glass envelope underlying each electrode. preferably with sufficient RF voltage to initiate a low pressure discharge. Plasma sheaths form on the inside of the glass wall opposite the external electrodes. Displacement current couples through the sheath that forms between the charge neutral plasma body and the wall, and conduction current is driven through the plasma column. The resulting gas discharge column is virtually identical to the discharge in a conventional fluorescent light source. However, the plasma sheath adjacent to the electrodes are quite different from a conventional fluorescent lamp in that the sheaths form a capacitor that acts as a ballast for the discharge and limits the discharge current. In addition, ion currents in the RF discharge are substantially lower than found in a low frequency fluorescent discharge lamp, thus resulting in less ion flux to the electrode area.

Figure 2:
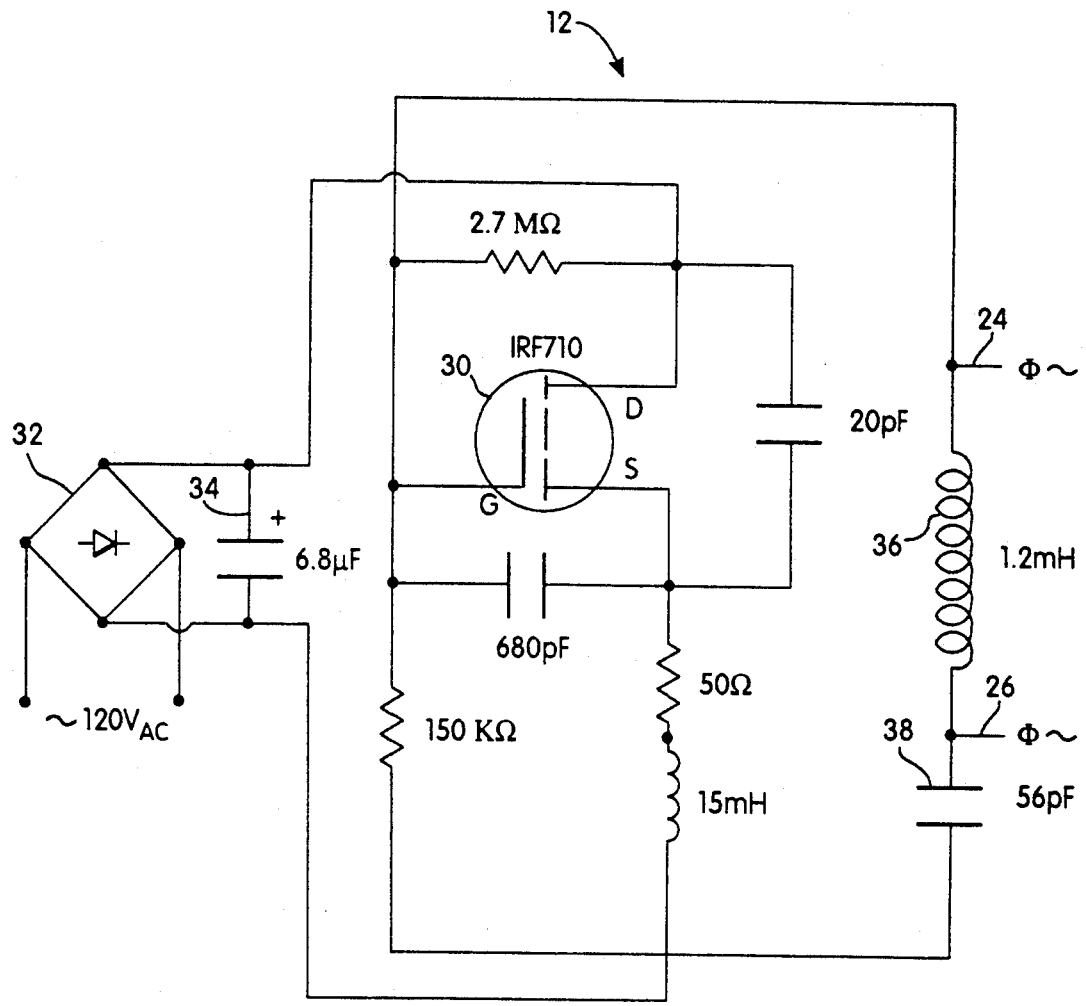
FIG. 2 is a schematic diagram of one example of a RF source that is suitable for the fluorescent light source.

A schematic diagram of a suitable RF source 12 is shown in FIG. 2. A single field effect transistor 30 functions as an amplifier and an oscillator at a frequency of 27.12 MHz. A bridge rectifier 32 and a capacitor 34 convert AC line voltage at 60 Hz to a DC voltage. The transistor 30 operates into a resonant tank circuit, including an inductor 36 and a capacitor 38, which provides sufficient starting and operating voltage on output leads 24 and 26 to initiate a discharge within fluorescent lamp 10 instantly. The output voltage is typically about 350 volts. The disclosed circuit is low cost and simple to build and uses a general purpose, commercially-available transistor. The circuit produces about 8–12 watts of RF power with an efficiency between 60% and 70%. Since the transistor 30 operates with a grounded drain, the drain can be attached to an available heat sink. The lamp is driven symmetrically, thus reducing ion flux to the electrode area and reducing RF radiation.

Figure 3:
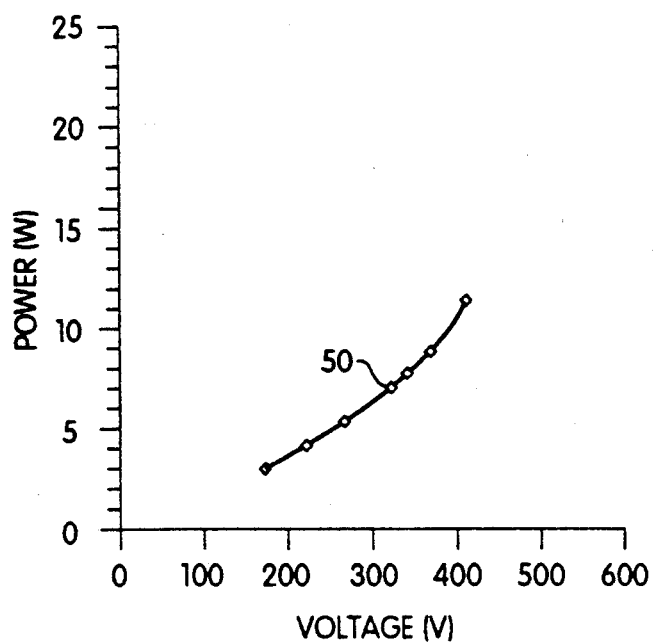
FIG. 3 is a graph of fluorescent lamp discharge power as a function of RF voltage.
Figure 4:
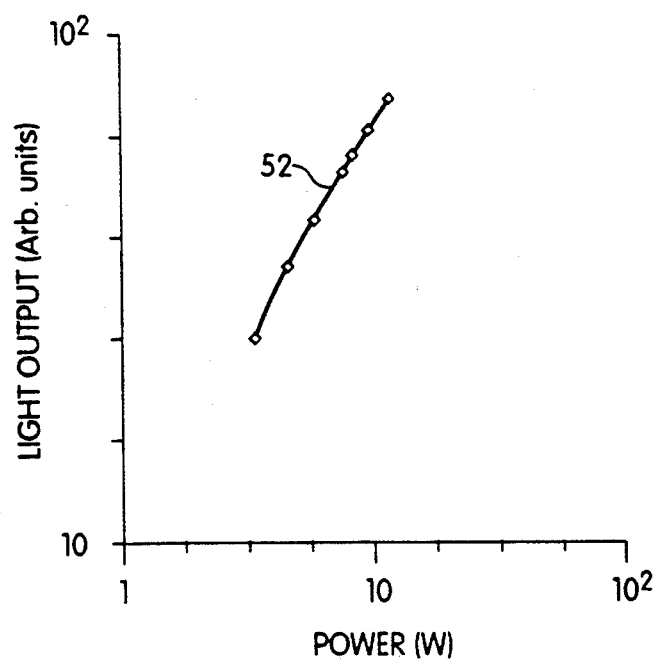
FIG. 4 is a graph of relative light output as a function of discharge power.

Typical curves of the operating characteristics of the fluorescent light source of the present invention are shown in FIGS. 3 and 4. Discharge power as a function of discharge voltage, with the fluorescent lamp driven at 27 MHz, is represented by curve 50 in FIG. 3. Relative light output as a function of discharge power is represented by curve 52 in FIG. 4. The operating characteristics in FIGS. 3 and 4 indicate that the fluorescent light source of the invention is dimmable by reducing the RF voltage applied to the twin tube fluorescent lamp. The lamp can be operated from 3-10 watts with approximately the same efficacy (lumens per watt) at all power levels. The RF source circuit of FIG. 2 can be modified to provide a variable RF voltage for dimming. As shown in FIG. 3, the fluorescent lamp operates at about 350-400 volts, which corresponds to 8-10 watts in the discharge. The overall output during normal operation is estimated to be 50-60 lumens per watt. A preferred operating frequency is 27.12 MHz because the FCC allows radiation of significant power at this frequency.

The twin tube fluorescent lamp used in the fluorescent light source of the present invention produces less RF radiation than a straight fluorescent lamp because the twin tube fluorescent lamp as shown in FIG. 1 is folded back on itself, thus limiting RF radiation. Another advantage of the twin tube fluorescent lamp configuration is that the coupling ends are close together, thereby making it convenient to attach the RF source without long leads and possible radiation losses from coupling leads.

Figure 5:
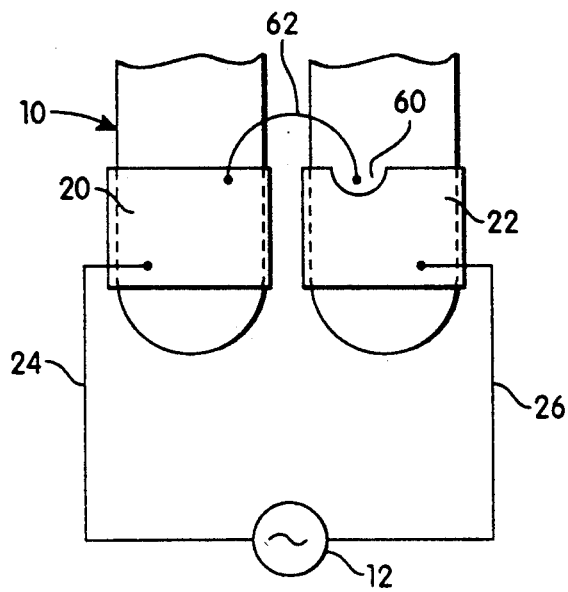
FIG. 5 is a partial schematic view of the twin tube fluorescent lamp in the light source of FIG. 1, showing external capacitive coupling electrodes and a starting device.

An enlarged view of one end of fluorescent lamp 10 is shown in FIG. 5. Electrodes 20 and 22 can be metal layers, or bands, on the outside surface of twin tube fluorescent lamp 10 at or near the ends thereof. Because of the twin tube configuration, the electrodes 20 and 22 are adjacent to each other and are relatively close together. Preferably, electrodes 20 and 22 have a relatively large surface area to enhance capacitive coupling to the plasma of the low pressure discharge within fluorescent lamp 10. In this embodiment, no internal electrodes or filaments are required within fluorescent lamp 10. At a frequency of 27.12 MHz, external metal layers, or bands, ¾ inch long are suitable for capacitive coupling of RF electrical energy to the discharge.

As noted above, the RF source 12 typically provides a RF voltage of sufficient magnitude to initiate a low pressure discharge within fluorescent lamp 10. Although the RF voltage required to initiate discharge depends on lamp construction, a typical RF starting voltage is about 350 volts. In cases where the RF voltage is not sufficient to reliably initiate discharge, an additional starting device is preferably utilized. An example of a simple starting circuit is shown in FIG. 5. A notch 60 is formed in electrode 22, and a thin wire 62 is attached to the lamp envelope in notch 60. The other end of the wire 62 is connected to electrode 20. When the RF voltage of source 12 is applied to electrodes 20 and 22, a high field region is created within the lamp 10 adjacent to notch 60, causing a discharge to be initiated. Since the area of contact between wire 62 and fluorescent lamp 10 in notch 60 is very small, the current flow is very small and normal operation is not significantly affected. When a discharge is initiated at one point in the fluorescent lamp 10, the discharge then extends through the length of the lamp between electrodes 20 and 22.

Figure 6:
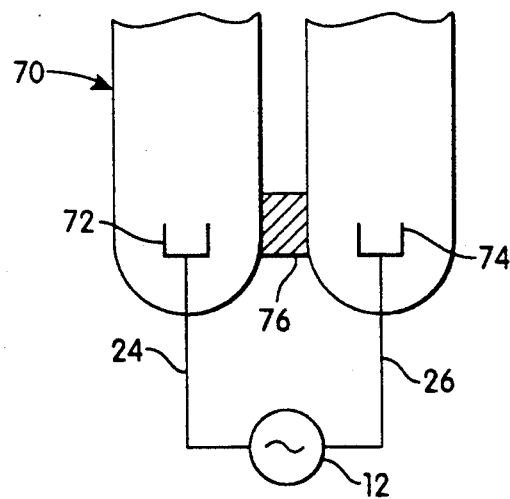
FIG. 6 is a partial schematic view of an alternate embodiment of the invention, showing a twin tube fluorescent lamp having cold cathode electrodes and a high permittivity dielectric material to enhance starting.

An alternative embodiment of the twin tube fluorescent lamp suitable for use in a fluorescent light source of the present invention is shown in FIG. 6. A twin tube fluorescent lamp 70 has internally mounted cold cathode electrodes 72 and 74 at or near opposite ends. The cold cathode electrodes 72 and 74 can be nickel or nickel impregnated with Hg (to dispense Hg). To enhance starting, a high permittivity dielectric fill material 76 is located between the arms of the twin tube fluorescent lamp 70. The high permittivity material increases the electric field inside the tube in the volume between the electrodes 72 and 74 sufficiently to initiate breakdown. The high permittivity material can, for example, be glass ($\epsilon_\gamma \sim 5$).

While there have been shown and described what are at present considered the preferred embodiments of the present invention, it will be obvious to those skilled in the art that various changes and modifications may be made therein without departing from the scope of the invention as defined by the appended claims.

What is claimed is:

1. A fluorescent light source comprising:
a fluorescent lamp having first and second electrodes disposed at or near the ends thereof for capacitive coupling of RF electrical energy to a low pressure discharge within said fluorescent lamp, said first and second electrodes comprising conductive layers on the outside surface of said fluorescent lamp, one of said conductive layers defining a notch therein and a localized region of said fluorescent lamp;
starting means for initiating a low pressure discharge within said fluorescent lamp comprising means coupled to said RF source for applying the voltage of said RF source to said localized region of said fluorescent lamp; and
a RF source having a first output lead electrically coupled to said first electrode and a second output lead electrically coupled to said second electrode.

2. A fluorescent light source as defined in claim 1 wherein said fluorescent lamp comprises two straight tube sections and an interconnection between said straight tube sections at or near one end, said first and second electrodes being located adjacent to each other at or near the other end.

3. A fluorescent light source as defined in claim 1 wherein said RF source has a frequency in the range of about 3 MHz to 300 MHz.

4. A fluorescent light source as defined in claim 1 wherein said RF source has a frequency in the range of about 10 MHz to 100 MHz.

5. A fluorescent light source as defined in claim 1 further including a lamp base for supporting said fluorescent lamp, said RF source being mounted within said lamp base.

6. A fluorescent light source comprising:
a lamp base including a plug for installation in a lamp socket;
a fluorescent lamp supported by said lamp base, said twin tube fluorescent lamp having first and second electrodes at or near the ends thereof for capacitive coupling of RF electrical energy to a low pressure discharge within said fluorescent lamp, said first and second electrodes comprising conductive layers on the outside surface of said fluorescent lamp, one of said conductive layers defining a notch therein and a localized region of said fluorescent lamp;
starting means for initiating a low pressure discharge within said fluorescent lamp comprising means coupled to said RF source for applying the voltage of said RF source to said localized region of said fluorescent lamp; and
a RF source located within said lamp base, said RF source having a first output lead electrically coupled to said first electrode and a second output lead electrically coupled to said second electrode.

7. A fluorescent light source as defined in claim 6 wherein said fluorescent lamp comprises two straight tube sections and an interconnection between said straight tube sections at or near one end, said first and second electrodes being located adjacent to each other at or near the other end.

8. The fluorescent light source of claim 1 wherein said means coupled to said RF source for applying the voltage of said RF source to said localized region of said fluorescent lamp comprises a wire having one end thereof connected to the other of said conductive layers and the other end thereof attached to said localized region of said fluorescent lamp in said notch of said one of said conductive layers.

* * * * *